(12) United States Patent
Sweat et al.

(10) Patent No.: US 8,510,134 B1
(45) Date of Patent: Aug. 13, 2013

(54) SYSTEM AND METHOD OF PROVIDING DEVICES FOR INJURIES UNDER WORKER'S COMPENSATION COVERAGE

(75) Inventors: Charles Sweat, Hendersonville, TN (US); Nicholas DiMola, New Port Richey, FL (US); Steven MacDonald, Tampa, FL (US); John Kime, Tampa, FL (US); James Pace, Tampa, FL (US); Jason Hillhouse, Palm Harbor, FL (US)

(73) Assignee: Matrix Healthcare Services, Inc., Tampa, FL (US)

( * ) Notice: Subject to any disclaimer, the term of this patent is extended or adjusted under 35 U.S.C. 154(b) by 56 days.

(21) Appl. No.: 13/032,441

(22) Filed: Feb. 22, 2011
(Under 37 CFR 1.47)

Related U.S. Application Data

(60) Provisional application No. 61/306,760, filed on Feb. 22, 2010.

(51) Int. Cl.
*G06Q 40/00* (2012.01)
(52) U.S. Cl.
USPC .................................................. 705/4; 705/2
(58) Field of Classification Search
None
See application file for complete search history.

(56) References Cited

U.S. PATENT DOCUMENTS

| 6,266,649 | B1 * | 7/2001 | Linden et al. ................. 705/7.29 |
| 7,395,217 | B1 * | 7/2008 | Stevens et al. ..................... 705/4 |
| 2005/0182660 | A1 * | 8/2005 | Henley ............................. 705/2 |

OTHER PUBLICATIONS

Margie Manning, Tech firm uncovers growth avenues, myMatrixx enlists effective personnel at all levels., Tampa Bay Business Journal, Oct. 30, 2009, www.tampabay.bizjournals.com.

* cited by examiner

*Primary Examiner* — Jason M Borlinghaus
*Assistant Examiner* — Ambreen A Alladin
(74) *Attorney, Agent, or Firm* — Greenberg Traurig, LLP

(57) ABSTRACT

A computer system including a server and software, for example, provides items and services for injuries under workman's compensation coverage through a web portal. An automated request to provide an item is transmitted from the server over the network setting a specific price, such that the one or more of a plurality of providers is capable of accepting the automated request using the network connected to the server. A care cart may be customizable by the adjuster or the adjuster's employer. Items are added automatically by the system to a care cart using an automated algorithm relating specific items to both an injury code and a zip code, and the system transmits the care cart to the adjuster portal and presents the adjuster with options.

8 Claims, 40 Drawing Sheets

| | A | B | C | D | E | F | G | H | I | J | K | L | M | N |
|---|---|---|---|---|---|---|---|---|---|---|---|---|---|---|
| 1 | Hcpcs | Modifier | Modifier | Jurisdicti | Category | CeilingA | FloorAm | ALAmou | ARAmou | AZAmou | CAAmou | COAmou | CTAmou | DCAmou |
| 2 | A4216 | | | D | OS | 0.47 | 0.4 | 0.45 | 0.47 | 0.46 | 0.47 | 0.47 | 0.47 | 0.47 |
| 3 | A4217 | | | D | SU | 3.29 | 2.8 | 2.8 | 3.29 | 3.29 | 2.8 | 3.29 | 3.29 | 2.92 |
| 4 | A4217 | AU | | D | OS | 3.29 | 2.8 | 2.8 | 3.29 | 3.29 | 2.8 | 3.29 | 3.29 | 2.92 |
| 5 | A4221 | | | D | SU | 23.75 | 20.19 | 23.75 | 23.75 | 23.35 | 23.35 | 23.75 | 23.75 | 23.75 |
| 6 | A4222 | | | D | SU | 49.02 | 41.67 | 49.02 | 49.02 | 46.33 | 46.33 | 49.02 | 49.02 | 47.14 |
| 7 | A4233 | NU | | D | IN | 0.84 | 0.71 | 0.84 | 0.84 | 0.84 | 0.84 | 0.84 | 0.84 | 0.84 |
| 8 | A4233 | NU | KL | D | IN | 0.72 | 0.61 | 0.72 | 0.72 | 0.72 | 0.72 | 0.72 | 0.72 | 0.72 |
| 9 | A4234 | NU | | D | IN | 3.81 | 3.24 | 3.81 | 3.81 | 3.81 | 3.81 | 3.81 | 3.81 | 3.81 |
| 10 | A4234 | NU | KL | D | IN | 3.29 | 2.8 | 3.29 | 3.29 | 3.29 | 3.29 | 3.29 | 3.29 | 3.29 |
| 11 | A4235 | NU | | D | IN | 2.46 | 2.09 | 2.46 | 2.46 | 2.46 | 2.46 | 2.46 | 2.46 | 2.46 |
| 12 | A4235 | NU | KL | D | IN | 2.12 | 1.8 | 2.12 | 2.12 | 2.12 | 2.12 | 2.12 | 2.12 | 2.12 |
| 13 | A4236 | NU | | D | IN | 1.76 | 1.5 | 1.76 | 1.76 | 1.76 | 1.76 | 1.76 | 1.76 | 1.76 |
| 14 | A4236 | NU | KL | D | IN | 1.52 | 1.29 | 1.52 | 1.52 | 1.52 | 1.52 | 1.52 | 1.52 | 1.52 |
| 15 | A4253 | NU | | D | IN | 0 | 0 | 38.75 | 38.75 | 37.94 | 38.75 | 34.35 | 38.75 | 38.75 |
| 16 | A4253 | NU | KL | D | IN | 0 | 0 | 33.4 | 33.4 | 32.7 | 33.4 | 29.6 | 33.4 | 33.4 |
| 17 | A4255 | | | D | IN | 4.32 | 3.67 | 4.32 | 4.32 | 4.32 | 4.32 | 4.32 | 4.11 | 4.11 |
| 18 | A4256 | | | D | SU | 12 | 10.2 | 12 | 12 | 10.2 | 10.2 | 12 | 12 | 10.2 |
| 19 | A4256 | KL | | D | SU | 10.34 | 8.79 | 10.34 | 8.79 | 8.79 | 8.79 | 10.34 | 10.34 | 8.79 |
| 20 | A4257 | | | D | SU | 13.38 | 11.37 | 13.38 | 13.38 | 13.38 | 13.38 | 13.38 | 13.38 | 13.38 |
| 21 | A4258 | | | D | SU | 18.93 | 16.09 | 18.93 | 18.93 | 18.62 | 18.62 | 18.93 | 18.93 | 18.93 |
| 22 | A4258 | KL | | D | SU | 16.32 | 13.87 | 16.32 | 16.32 | 16.04 | 16.04 | 16.32 | 16.32 | 16.32 |
| 23 | A4259 | | | D | SU | 0 | 0 | 11.36 | 12.65 | 12.65 | 12.65 | 12.65 | 12.65 | 11.36 |
| 24 | A4259 | KL | | D | SU | 0 | 0 | 9.79 | 10.9 | 10.9 | 10.9 | 10.9 | 10.9 | 9.79 |
| 25 | A4265 | | | D | SU | 3.56 | 3.03 | 3.56 | 3.56 | 3.56 | 3.56 | 3.56 | 3.56 | 3.56 |
| 26 | A4280 | | | D | PO | 6.67 | 5 | 5.59 | 5.59 | 5.44 | 5.44 | 5.6 | 5.71 | 5.44 |
| 27 | A4310 | | | D | OS | 8.1 | 6.89 | 7.31 | 7.12 | 8.08 | 8.1 | 8.1 | 8.1 | 7.49 |
| 28 | A4311 | | | D | OS | 15.56 | 13.23 | 15.56 | 15.56 | 15.39 | 15.56 | 13.77 | 14.59 | 13.23 |
| 29 | A4312 | | | D | OS | 18.92 | 16.08 | 16.31 | 18.92 | 18.92 | 18.92 | 16.08 | 16.08 | 16.08 |

FIG. 21

| State | HCPCS | Modifier | StateModifier | MedicaidAmount |
|---|---|---|---|---|
| NY | A4216 | null | null | 0.37 |
| NY | A4217 | AU | null | 1.58 |
| NY | A4221 | null | null | 1 |
| NY | A4230 | null | null | 15.05 |
| NY | A4231 | null | null | 6.27 |
| NY | A4233 | null | null | 0.71 |
| NY | A4234 | null | null | 3.25 |
| NY | A4235 | null | null | 2.34 |
| NY | A4244 | null | null | 1.12 |
| NY | A4245 | NU | null | 1.39 |
| NY | A4246 | null | null | 2.96 |
| NY | A4250 | null | null | 18.85 |
| NY | A4252 | null | null | 4.45 |
| NY | A4253 | NU | null | 38.79 |
| NY | A4256 | null | null | 8.62 |
| NY | A4258 | null | null | 12.95 |
| NY | A4259 | null | null | 6.56 |
| NY | A4265 | null | null | 3.33 |
| NY | A4267 | null | null | 0.39 |
| NY | A4268 | null | null | 3.5 |
| NY | A4310 | null | null | 2.13 |
| NY | A4311 | null | null | 5.94 |
| NY | A4314 | null | null | 11.73 |
| NY | A4320 | null | null | 1.67 |
| NY | A4322 | null | null | 1.01 |
| NY | A4326 | null | null | 4.82 |
| NY | A4331 | null | null | 1.8 |
| NY | A4333 | null | null | 2.31 |
| NY | A4334 | null | null | 1.36 |
| NY | A4338 | null | null | 1.34 |

FIG. 22

| | A | B | C | D | E | F | G | H | I | J | K | L | M | N | O | P | Q | R | S | T | U | V | W |
|---|---|---|---|---|---|---|---|---|---|---|---|---|---|---|---|---|---|---|---|---|---|---|---|
| 1 | State | HCPCS | Modifier | Uni | Sta | Sta | Contr | Usua | FixedCost | NegcCost | Medic | Medic | BilledP | CostP | Great | Less | Invoic | Rental | RxRec | Op3( | DMEC | Cover( | ByR( |
| 2 | NC | 70010 | null | | | | N | 0 | 374.52 | 0 | 0 | 0 | 0 | 0 | N | N | N | 99 | N | N | N | N | N |
| 3 | NC | 70015 | null | | | | N | 0 | 194.73 | 0 | 0 | 0 | 0 | 0 | N | N | N | 99 | N | N | N | N | N |
| 4 | NC | 70030 | null | | | | N | 0 | 42.06 | 0 | 0 | 0 | 0 | 0 | N | N | N | 99 | N | N | N | N | N |
| 5 | NC | 70100 | null | | | | N | 0 | 49.53 | 0 | 0 | 0 | 0 | 0 | N | N | N | 99 | N | N | N | N | N |
| 6 | NC | 70110 | null | | | | N | 0 | 61.74 | 0 | 0 | 0 | 0 | 0 | N | N | N | 99 | N | N | N | N | N |
| 7 | NC | 70120 | null | | | | N | 0 | 54.96 | 0 | 0 | 0 | 0 | 0 | N | N | N | 99 | N | N | N | N | N |
| 8 | NC | 70130 | null | | | | N | 0 | 80.73 | 0 | 0 | 0 | 0 | 0 | N | N | N | 99 | N | N | N | N | N |
| 9 | NC | 70134 | null | | | | N | 0 | 77.34 | 0 | 0 | 0 | 0 | 0 | N | N | N | 99 | N | N | N | N | N |
| 10 | NC | 70140 | null | | | | N | 0 | 55.64 | 0 | 0 | 0 | 0 | 0 | N | N | N | 99 | N | N | N | N | N |
| 11 | NC | 70150 | null | | | | N | 0 | 72.6 | 0 | 0 | 0 | 0 | 0 | N | N | N | 99 | N | N | N | N | N |
| 12 | NC | 70160 | null | | | | N | 0 | 48.18 | 0 | 0 | 0 | 0 | 0 | N | N | N | 99 | N | N | N | N | N |
| 13 | NC | 70170 | null | | | | N | 0 | 86.16 | 0 | 0 | 0 | 0 | 0 | N | N | N | 99 | N | N | N | N | N |
| 14 | NC | 70190 | null | | | | N | 0 | 57.66 | 0 | 0 | 0 | 0 | 0 | N | N | N | 99 | N | N | N | N | N |
| 15 | NC | 70200 | null | | | | N | 0 | 74.64 | 0 | 0 | 0 | 0 | 0 | N | N | N | 99 | N | N | N | N | N |
| 16 | NC | 70210 | null | | | | N | 0 | 53.61 | 0 | 0 | 0 | 0 | 0 | N | N | N | 99 | N | N | N | N | N |
| 17 | NC | 70220 | null | | | | N | 0 | 71.91 | 0 | 0 | 0 | 0 | 0 | N | N | N | 99 | N | N | N | N | N |
| 18 | NC | 70240 | null | | | | N | 0 | 44.1 | 0 | 0 | 0 | 0 | 0 | N | N | N | 99 | N | N | N | N | N |
| 19 | NC | 70250 | null | | | | N | 0 | 60.39 | 0 | 0 | 0 | 0 | 0 | N | N | N | 99 | N | N | N | N | N |
| 20 | NC | 70260 | null | | | | N | 0 | 86.85 | 0 | 0 | 0 | 0 | 0 | N | N | N | 99 | N | N | N | N | N |
| 21 | NC | 70300 | null | | | | N | 0 | 25.77 | 0 | 0 | 0 | 0 | 0 | N | N | N | 99 | N | N | N | N | N |
| 22 | NC | 70310 | null | | | | N | 0 | 40.71 | 0 | 0 | 0 | 0 | 0 | N | N | N | 99 | N | N | N | N | N |
| 23 | NC | 70320 | null | | | | N | 0 | 69.21 | 0 | 0 | 0 | 0 | 0 | N | N | N | 99 | N | N | N | N | N |
| 24 | NC | 70328 | null | | | | N | 0 | 47.49 | 0 | 0 | 0 | 0 | 0 | N | N | N | 99 | N | N | N | N | N |
| 25 | NC | 70330 | null | | | | N | 0 | 73.95 | 0 | 0 | 0 | 0 | 0 | N | N | N | 99 | N | N | N | N | N |
| 26 | NC | 70332 | null | | | | N | 0 | 179.12 | 0 | 0 | 0 | 0 | 0 | N | N | N | 99 | N | N | N | N | N |
| 27 | NC | 70336 | null | | | | N | 0 | 768.71 | 0 | 0 | 0 | 0 | 0 | N | N | N | 99 | N | N | N | N | N |
| 28 | NC | 70350 | null | | | | N | 0 | 39.36 | 0 | 0 | 0 | 0 | 0 | N | N | N | 99 | N | N | N | N | N |
| 29 | NC | 70355 | null | | | | N | 0 | 53.61 | 0 | 0 | 0 | 0 | 0 | N | N | N | 99 | N | N | N | N | N |

FIG. 23

| | A | B | C | D | E | F | G | H | I |
|---|---|---|---|---|---|---|---|---|---|
| 1 | HCPCS | Modifier | UnitOfMeasure | HCPCSLongDescription | HCPCSShortDescription | Price | Fixed | Medicare% | CostPlus |
| 2 | A4245 | NU | Box | ALCOHOL WIPES, PER BOX | Alcohol wipes per box | 2.5 | 0 | 0 | 0 |
| 3 | A4305 | NU | Each | DISPOSABLE DRUG DELIVERY SYSTEM, FLOW RATE OF 50 ML OR GREATER PER HOUR | Drug delivery system >=50 ML Pain Pump | 390 | 0 | 0 | 0 |
| 4 | A4306 | NU | Each | DISPOSABLE DRUG DELIVERY SYSTEM, FLOW RATE OF LESS THAN 50 ML PER HOUR | Drug delivery system <=50 ml PainPump | 425 | 0 | 0 | 0 |
| 5 | A4455 | NU | oz | ADHESIVE REMOVER OR SOLVENT (FOR TAPE, CEMENT OR OTHER ADHESIVE), PER OUNCE | Adhesive remover per ounce | 2 | 0 | 0 | 0 |
| 6 | A4556 | NU | Pair | ELECTRODES, (E.G., APNEA MONITOR), PER PAIR | Electrodes, pair | 12.5 | 0 | 0 | 0 |
| 7 | A4557 | NU | Pair | LEAD WIRES, (E.G., APNEA MONITOR), PER PAIR | Lead wires, pair | 10 | 0 | 0 | 0 |
| | | | | CONDUCTIVE GEL OR PASTE, FOR | | | | | |

FIG. 24

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 1 | MatrixItem | Provide Service | HCPCS | HCPCSLoL | MedicareUnitOfMe | HCPCSLoL | HCPCSShort | Manufactu | Manufactu | ProviderIte | ProvideRe | ProviderBillingQu | LowerR | UpperR | NationalRe | NationalRe | MedicareStateFe | StateFeLesser |
| 2 | 4192187 | 396 | 20 A4206 | NU | BOX | SYRINGE | 1 CC sterile s | Medline | SWD5111 | Syringe, ne | SWD5111 | 1 | 100 | 0 | 0 | 22.9125 | 0 | 0 N |
| 3 | 4192188 | 396 | 20 A4206 | NU | BOX | SYRINGE | 1 CC sterile s | Medline | SWD5111 | Syringe, ne | SWD5111 | 1 | 100 | 0 | 0 | 22.9125 | 0 | 0 N |
| 4 | 4192189 | 396 | 20 A4206 | NU | BOX | SYRINGE | 1 CC sterile s | Medline | SWD5112 | Syringe, w/ | SWD5112 | 1 | 100 | 0 | 0 | 20.05 | 0 | 0 N |
| 5 | 4192190 | 396 | 20 A4206 | NU | CASE | SYRINGE | 1 CC sterile s | Medline | SWD5111 | Syringe, ne | SWD5111 | 1 | 500 | 0 | 0 | 114.35 | 0 | 0 N |
| 6 | 4192191 | 396 | 20 A4206 | NU | CASE | SYRINGE | 1 CC sterile s | Medline | SWD5111 | Syringe, ne | SWD5111 | 1 | 500 | 0 | 0 | 114.35 | 0 | 0 N |
| 7 | 4192192 | 396 | 20 A4208 | NU | BOX | SYRINGE | 3 CC sterile s | Medline | SWD5333 | Syringe, ne | SWD5333 | 1 | 100 | 0 | 0 | 20.4875 | 0 | 0 N |
| 8 | 4192193 | 396 | 20 A4208 | NU | BOX | SYRINGE | 3 CC sterile s | Medline | SWD5332 | Syringe, w/ | SWD5332 | 1 | 100 | 0 | 0 | 20.4875 | 0 | 0 N |
| 9 | 4192194 | 396 | 20 A4209 | NU | BOX | SYRINGE | 5+ CC sterile | Medline | SWD5220 | Syringe, sa | SWD5220 | 1 | 50 | 0 | 0 | 22.0625 | 0 | 0 N |
| 10 | 4192195 | 396 | 20 A4213 | NU | CASE | SYRINGE | 20+ CC syrin | Medline | SWD5601 | Syringe on | SWD5601 | 1 | 100 | 0 | 0 | 49.475 | 0 | 0 N |
| 11 | 4192196 | 396 | 20 A4216 | null | EACH | STERILE | Sterile water/ | Medline | PCS1650 | Water, ster | PCS1650 | 1 | 1 | 0 | 0 | 1.1625 | 0 | 0 N |
| 12 | 4192197 | 396 | 20 A4216 | null | EACH | STERILE | Sterile water/ | Medline | PCS1650 | Saline, ster | PCS1650 | 1 | 1 | 0 | 0 | 1.1625 | 0 | 0 N |
| 13 | 4192198 | 396 | 20 A4216 | null | EACH | STERILE | Sterile water/ | Medline | DYND405 | Water, ster | DYND405 | 1 | 1 | 0 | 0 | 0.65 | 0 | 0 N |
| 14 | 4192199 | 396 | 20 A4216 | null | EACH | STERILE | Sterile water/ | Medline | DYND405 | Saline, 0.9 | DYND405 | 1 | 1 | 0 | 0 | 0.65 | 0 | 0 N |
| 15 | 4192200 | 396 | 20 A4216 | null | CASE | STERILE | Sterile water/ | Medline | PCS1650 | Water, ster | PCS1650 | 1 | 24 | 0 | 0 | 27.66 | 0 | 0 N |
| 16 | 4192201 | 396 | 20 A4216 | null | CASE | STERILE | Sterile water/ | Medline | PCS1650 | Saline, ster | PCS1650 | 1 | 24 | 0 | 0 | 27.66 | 0 | 0 N |
| 17 | 4192202 | 396 | 20 A4216 | null | CASE | STERILE | Sterile water/ | Medline | DYND405 | Saline, 0.9 | DYND405 | 1 | 48 | 0 | 0 | 21.46 | 0 | 0 N |
| 18 | 4192203 | 396 | 20 A4216 | null | CASE | STERILE | Sterile water/ | Medline | DYND405 | Water, ster | DYND405 | 1 | 48 | 0 | 0 | 20.63 | 0 | 0 N |
| 19 | 4192204 | 396 | 20 A4221 | null | CASE | SUPPLIES | Maint drug inf | Medline | DYND746 | Tray dress | DYND746 | 1 | 40 | 0 | 0 | 70.63 | 0 | 0 N |
| 20 | 4192205 | 396 | 20 A4221 | null | CASE | SUPPLIES | Maint drug inf | Medline | DYND746 | Tray dress | DYND746 | 1 | 24 | 0 | 0 | 75.6375 | 0 | 0 N |
| 21 | 4192206 | 396 | 20 A4221 | null | CASE | SUPPLIES | Maint drug inf | Medline | DYND747 | Tray dress | DYND747 | 1 | 40 | 0 | 0 | 87.06 | 0 | 0 N |
| 22 | 4192207 | 396 | 20 A4221 | null | CASE | SUPPLIES | Maint drug inf | Medline | DYNJ0330 | Tray dress | DYNJ0330 | 1 | 40 | 0 | 0 | 87.49 | 0 | 0 N |
| 23 | 4192208 | 396 | 20 A4221 | null | CASE | SUPPLIES | Maint drug inf | Medline | DYNJ0200 | Tray dress | DYNJ0200 | 1 | 24 | 0 | 0 | 87.53 | 0 | 0 N |
| 24 | 4192209 | 396 | 20 A4221 | null | CASE | SUPPLIES | Maint drug inf | Medline | DYND752 | Tray dress | DYND752 | 1 | 40 | 0 | 0 | 91.275 | 0 | 0 N |
| 25 | 4192210 | 396 | 20 A4221 | null | CASE | SUPPLIES | Maint drug inf | Medline | DYND752 | Tray cvp cl | DYND752 | 1 | 40 | 0 | 0 | 96.7375 | 0 | 0 N |
| 26 | 4192211 | 396 | 20 A4221 | null | CASE | SUPPLIES | Maint drug inf | Medline | DYND752 | Tray dress | DYND752 | 1 | 40 | 0 | 0 | 106.91 | 0 | 0 N |
| 27 | 4192212 | 396 | 20 A4221 | null | CASE | SUPPLIES | Maint drug inf | Medline | DYND752 | Tray dress | DYND752 | 1 | 40 | 0 | 0 | 118.4 | 0 | 0 N |
| 28 | 4192213 | 396 | 20 A4221 | null | CASE | SUPPLIES | Maint drug inf | Medline | DYND746 | Tray dress | DYND746 | 1 | 20 | 0 | 0 | 56.5125 | 0 | 0 N |
| 29 | 4192214 | 396 | 20 A4221 | null | CASE | SUPPLIES | Maint drug inf | Medline | DYNJ0303 | Tray dress | DYNJ0303 | 1 | 28 | 0 | 0 | 65.12 | 0 | 0 N |
| 30 | 4192215 | 396 | 20 A4221 | null | CASE | SUPPLIES | Maint drug inf | Medline | DYNJ0333 | Tray dress | DYNJ0333 | 1 | 28 | 0 | 0 | 65.4 | 0 | 0 N |
| 31 | 4192216 | 396 | 20 A4221 | null | CASE | SUPPLIES | Maint drug inf | Medline | DYND752 | Tray dress | DYND752 | 1 | 28 | 0 | 0 | 68.3 | 0 | 0 N |

FIG. 31 myMatrixx — good medicine for business

Patient Search | My Account | Log off
2:50:43 P.M. EST

Smart Care Cart Details

Name: 836 Dislocation / cartilage tear of knee /

Description: Items recommended for treatment of dislocation, cartilage tear of the knee and patellar dislocation;

Care Cart Items

| HCPCS | MOD | Description | Qty | Refills | |
|-------|-----|-------------|-----|---------|---|
|       |     |             |     |         | Add |
| E0135 | NU  | Walker folding adjust/fixed | 1 | 0 | Remove |
| E0114 | NU  | Crutch underarm pair no wood | 1 | 0 | Remove |
| L1830 | null | Ko immobilizer canvas longit | 1 | 0 | Remove |
| E0218 | NU  | null | 1 | 0 | Remove |
| E0935 | RR  | Cont pas motion exercise dev | 21 | 3 | Remove |
| A4450 | AU  | Non-waterproof tape | 720 | 1 | Remove |
| A6402 | null | Sterile gauze <= 16 sq in | 150 | 1 | Remove |
| E0165 | NU  | Commode chair with detacharm | 1 | 0 | Remove |

ICD-9 Codes

| ICD-9 Code | |
|------------|---|
|            | Add |
| 836.3      | Remove |
| 836.2      | Remove |
| 836.1      | Remove |
| 836.0      | Remove |
| 836        | Remove |

FIG. 32 myMatrixx
good medicine for business

Patient Search | Live Chat | Log Off

940 Burn confined to eye and adnexa Care Cart myMatrixx Recommended  Drop Ship

| | Code | Description | Vendor | Price | Savings | Savings % |
|---|---|---|---|---|---|---|
| ☑ ⊕ | A6410 | EYE PAD OVAL ST<br>Unit of Measure: BX/50 | McKesson | $14.60 | Savings: | Savings %: |
| ☑ ⊕ | A6199 | TEGADERM HG ALG DRSG ROPE<br>Unit of Measure: EA/1 | McKesson | $9.58 | Savings: | Savings %: |
| ☑ ⊕ | A6252 | DRSG PWDR 5 GRAM<br>Unit of Measure: CS/120 | McKesson | $12.50 | Savings: $0.00 | Savings %: <1% |
| ☑ ⊕ | A6196 | MAXORB EXTRA AG SILVER ALGINATE SHEET<br>2"X2" SOLD BY BOX 10/EA<br>Unit of Measure: BX/10 | Independence Medical | $1.26 | Savings: $0.00 | Savings %: <1% |
| ☑ ⊕ | A6442 | CONFORMING BNDG 1"X4.1YD<br>Unit of Measure: PK/24 | McKesson | $5.39 | Savings: | Savings %: |
| ☑ ⊕ | A6206 | CONFORMANT 2 WOUND VEIL 4" x 4", 48/CASE<br>SOLD BY CASE 48/EA<br>Unit of Measure: CA/48 | Independence Medical | $14.32 | Savings: $0.00 | Savings %: <1% |
| ☑ ⊕ | A6443 | BANDAGE,GAUZE,SOFORM,3"X75",LF NSTR SOF-FORM<br>CONFORMING BANDAGES: THIS PREMIER QUALITY<br>BANDAGE GENTLY SECURES TO ANY BODY CONTOUR<br>WITHOUT RESTRICTION OF MOVEMENT AND<br>ACCOMMODATES AN INCREASE OR DECREASE IN | Medline Industries | $4.43 | Savings: | Savings %: |

Care Cart

FIG. 34

FIG. 35 myMatrixx — good medicine for business | Log off

Patient Search | myChart | Care Cart

940 Burn confined to eye and adnexa Care Cart myMatrixx Recommended — Drop Ship

| | | | Vendor | Price | | Savings | Savings %: |
|---|---|---|---|---|---|---|---|
| ☑ | ⊕ | A6410 EYE PAD OVAL ST Unit of Measure: BX/50 | McKesson | $14.60 | | | |
| ☑ | ⊕ | A6199 TEGADERM HG ALG DRSG ROPE Unit of Measure: EA/1 | McKesson | $9.58 | | | |
| ☑ | ⊕ | A6262 POWDER MULTIDEX 6GM TUBE | McKesson | $12.50 | | $0.00 | <1% |

Filter:

| | Description | Vendor | Price | Unit of Measure | Savings | Savings % |
|---|---|---|---|---|---|---|
| Select | MULTIDEX HYDROPHILIC WOUND POWDER, 6 GRAM TUBE SOLD BY TUBE | Independence Medical | $10.71 | TB/6 | | |
| Select | POWDER MULTIDEX 6GM TUBE | McKesson | $12.50 | EA/1 | | |
| Select | MULTIDEX HYDROPHILIC WOUND POWDER, 12 GRAM TUBE SOLD BY TUBE 1/TB | Independence Medical | $15.42 | TB/12 | | |
| Select | POWDER MITROSOL 1OZ | McKesson | $19.83 | EA/1 | | |
| Select | MULTIDEX HYDROPHILIC WOUND POWDER, 25 GRAM TUBE SOLD BY TUBE | Independence Medical | $20.51 | TB/25 | | |
| Select | ARGLAES POWDER 5GM BOTTLE W/SCREW CAP ARGLAES POWDER DRESSING; ARGLAES POWDER CAN OFFER BIOBURDEN | | | | | |

Show 10 entries

FIG. 39

```
package com.matrixhcs.dme.alerts.triggers;

import org.apache.commons.lang.StringUtils;

import com.matrixhcs.bo.dme.Order;
import com.matrixhcs.bo.dme.OrderAlert;

public class ClaimantNameAlertTrigger extends AbstractAlertTrigger { public boolean checkOrder(Order order) {
        if (StringUtils.isEmpty(order.getClaimant().getName())) {
            return true;
        } return false;
    } public int getAlertType() {
        return OrderAlert.CLAIMANT_NAME_ALERT;
    }

SYSTEM AND METHOD OF PROVIDING DEVICES FOR INJURIES UNDER WORKER'S COMPENSATION COVERAGE

REFERENCE TO RELATED APPLICATION

This application claims the benefit of the filing date of U.S. Provisional Patent Application No. 61/306,760 filed Feb. 22, 2010, the description and figures of which are hereby incorporated by reference in its entirety.

FIELD OF THE INVENTION

The field relates to the filling of orders for durable medical equipment for worker's compensation claims.

BACKGROUND

In the area of worker's compensation claims, no innovation or technology has replaced the traditional method of adjusters calling vendors that manage the approval, delivery and scheduling process for durable medical equipment needed for patients covered by worker's compensation insurance. The adjuster typically calls for a quotation related to their injured worker's needs, and the vendor spends time calling suppliers of durable medical equipment to fill the adjusters' requests, and then the vendor contacts the adjuster with one or more quotations for supplying the requested item(s). If one of the suppliers can provide the device sooner than the others, then this may be more important than the usually small difference in costs between the various suppliers. Typically an adjuster receives a very small subset of options from one vendor, and relies on other vendors for a cost comparison and to fill all of the items needed for a single patient and a single injury or illness.

The applicant has identified certain deficiencies in the current system that affects the efficiency of the system for payers, adjusters and providers. The system has no paper trail for the approval of orders filled by providers after receiving calls from adjusters. Payers, which include the state, through a state worker's compensation fund, the insurance company and the employer, have no way of tracking approvals and deliveries of items to the patient/claimant, due to a lack of a paper trail. Approvals and payment for items supplied by the providers are often delayed or require multiple submissions to correct errors in paperwork created and submitted after the items have already been delivered to the patient. This increases overhead costs to providers, which are reflected in prices charged for items provided. These costs are passed on to employers through higher cost for self insured employers or higher employer's premiums paid into the system.

There has been and remains no incentive within the system to innovate or to apply technology to increase the efficiency of filling insurance adjusters' requests.

SUMMARY

Application of technology to the filling of requests from adjusters' worker's compensation claims is capable of revolutionizing the industry. A computer system and software stored on a computer readable medium offer a technical solution for automating the system that is primarily dependent on telephone orders and telephone call centers for reaching small, localized suppliers of durable medical equipment. In one example, the system connects payers, adjusters and providers in a process that provides an auditable system of approval by adjusters, review by payers, filling of orders by providers and payment to providers that dramatically reduces the overhead associated with paperwork submitted for approval of later reimbursement.

In one example, an SQL database server manages queries of a database from an insurance adjuster seeking durable medical equipment using a web portal provided on the World Wide Web (internet). The adjuster portal may allow instantaneous comparisons of costs and availability of items requested by the adjuster, with hundreds of options. For example, the adjuster portal may allow the adjuster to enter a code and/or a description of a particular injury or condition, and the adjuster portal will return with a list of available equipment related to the code and/or description. Typically, the adjuster enters an ICD9 code.

In one example, the adjuster portal automatically suggests a selection of items in the form of a smart care cart that are usually ordered for the code or the description entered by the adjuster. An injury based formulary may be provided, where multiple items specific to the injury are pre-defined and the computer returns a primary product and multiple options for the purpose of a quote by local zip-code. For example, the adjuster portal may allow the adjusters, or the insurance company employing more than one adjuster, to customize their own smart care carts. Then, each time a query is made, the same items and many options may be returned in the smart care cart. The system will also allow for variations to be made on the care cart so that enterprise care carts and localized care carts can be set up independent of one another to achieve the goal of returning appropriate quotes on all the various options by zip-code.

An algorithm may be used to select items for association in a smart cart. The algorithm may use the ICD9 code and the zip code to select a preexisting smart cart for the same ICD9 code and zip code. The care cart may be pre-determined based on a cross between the ICD9 code and the HCPCS codes. If no preexisting smart cart is available, then the system may gather a list of relevant items based on HCPCS codes and zip code, and the care cart may be created by the automated system as needed. Relevant items may be determined to be relevant based on preexisting order history for the same ICD9 code, for example, as provided in the database. The adjuster portal will present the smart cart to the adjuster who can add or delete items from the smart cart list. Then, the entire smart cart may be added to the current order and/or may be adopted as a smart cart for use by the adjuster in future orders relating to the same ICD9 code.

The adjuster portal may provide a variety of providers for the items requested and will provide an indication of the cost and availability of the items. In one example, a discount may be provided based on a contract between a broker and the insurance company employing the adjuster.

A provider portal may be provided to suppliers of durable medical equipment to manage their inventory and orders using a web portal provided on the World Wide Web. The providers may enter HCPCS codes, descriptions, prices and availability of items supplied by the particular provider. Alternatively, the inventory of various providers may be input and maintained by a broker. The provider portal may be used to upload data, including the direct order between a patient and/or a physician, such that vendor or broker may provide an adjuster with a link to the adjuster portal to approve, modify or deny the order. Providers gain visibility as to where an order is, such as whether the order has been approved and when payment will be made reducing labor, telephone follow-up, and duplicate billing. Cost reductions for both the adjuster side and the provider side of a transaction may be dramatically reduced by improving workflow and reducing overhead.

BRIEF DESCRIPTION OF THE DRAWINGS

FIGS. 2-7 illustrate an example of screens used in a provider portal.

FIGS. 8-19 illustrate examples of screens used in managing the system and in providing an adjuster portal.

FIG. 21 illustrates an example of a Medicare catalog, as shown in the overview of FIG. 20 (a), listing information by HCPCS codes in a spreadsheet format.

FIG. 22 illustrates an example of a Medicaid, as shown in the overview of FIG. 20 (b), catalog listing information by state and HCPCS codes in a spreadsheet format.

FIG. 23 illustrates an example of a State Fee Schedule catalog, as shown in the overview of FIG. 20 (c), listing information by state and HCPCS codes in a spreadsheet format.

FIG. 24 illustrates an example of a myMatrixx Usual and Customary catalog, as shown in the overview of FIG. 20 (d), listing information by HCPCS codes in a spreadsheet format, which provides information if the information is not available in one of the catalogs illustrated in FIGS. 21-23.

FIG. 25 illustrates an example of a Provider catalog in a spreadsheet format.

FIG. 29 illustrates an example of a search result screen.

FIG. 31 illustrates an example of a Care Cart Library screen shot.

FIG. 32 illustrates an example of Smart Care Cart Details screen shot.

FIG. 34 illustrates an example of a results screen shot for the example in FIG. 33.

FIG. 35 illustrates an example detail screen for an item showing a plurality of providers for each item in a Care Cart.

FIG. 39 illustrates an example of source code for an alerter class.

FIG. 40 illustrates an example of an alert screen shot for order #5244.

DETAILED DESCRIPTION

Figure 1:
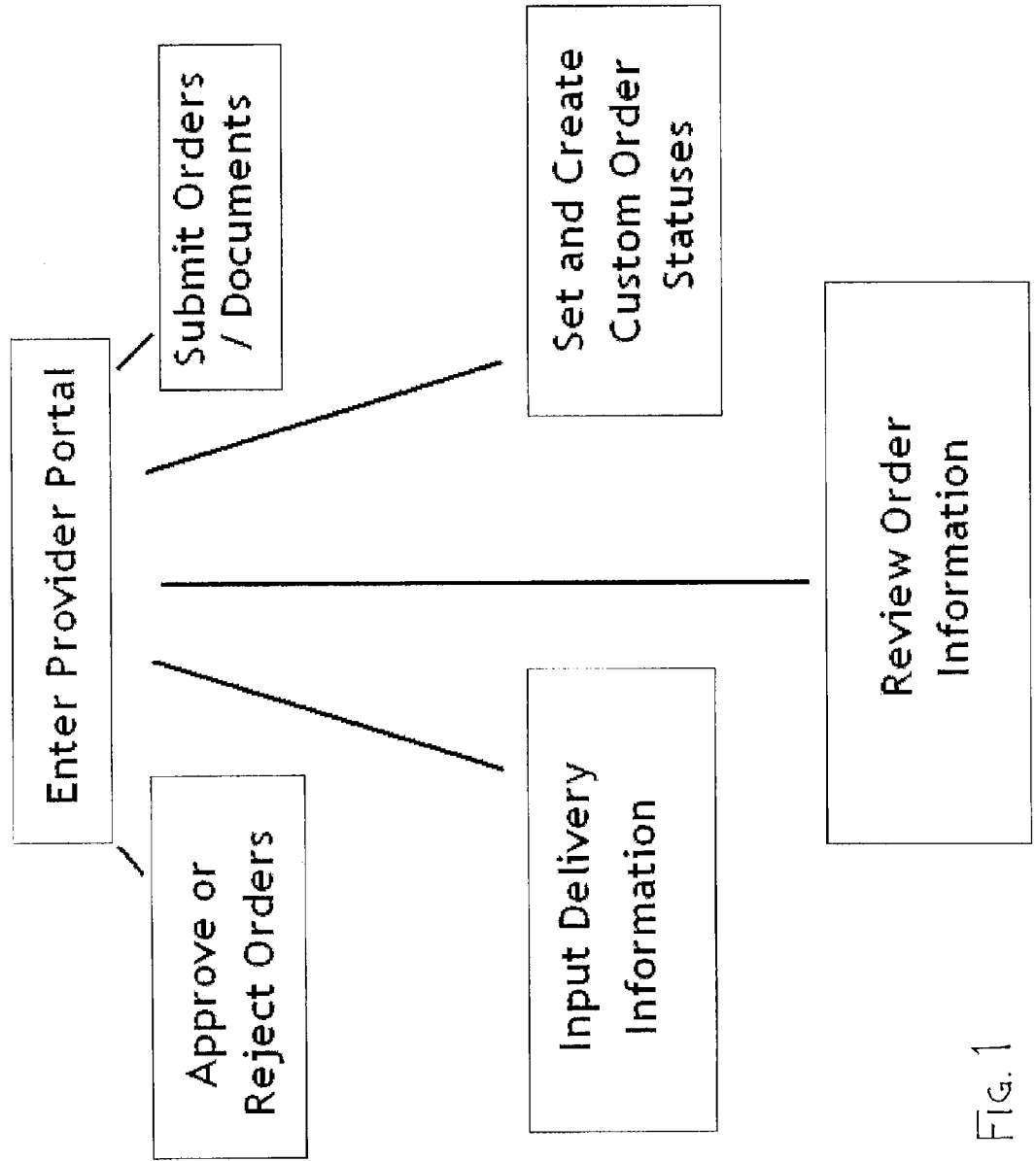
FIG. 1 illustrates a flow diagram of a provider portal.
Figure 2:
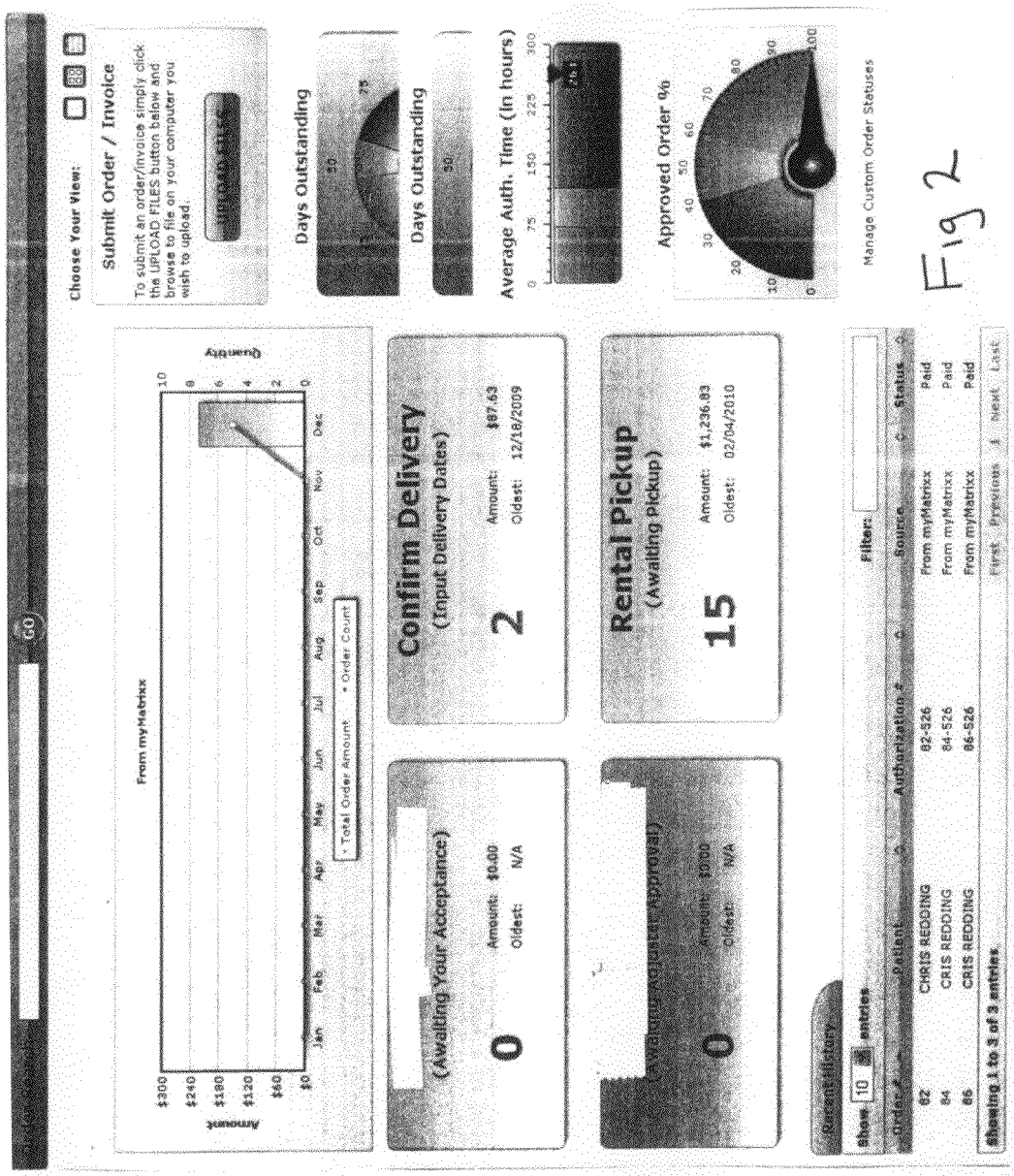
Figure 5:
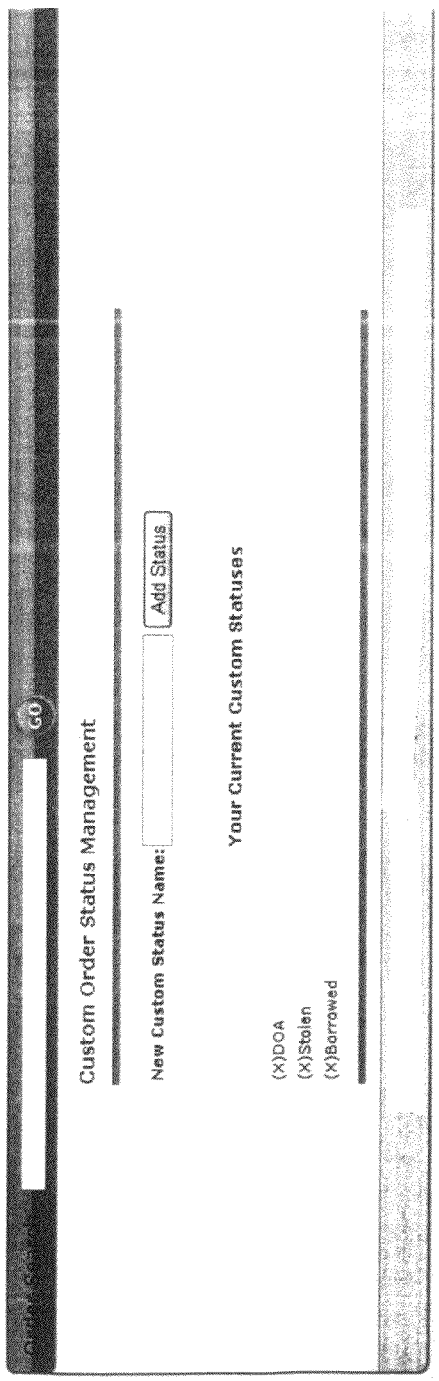
Figure 7:
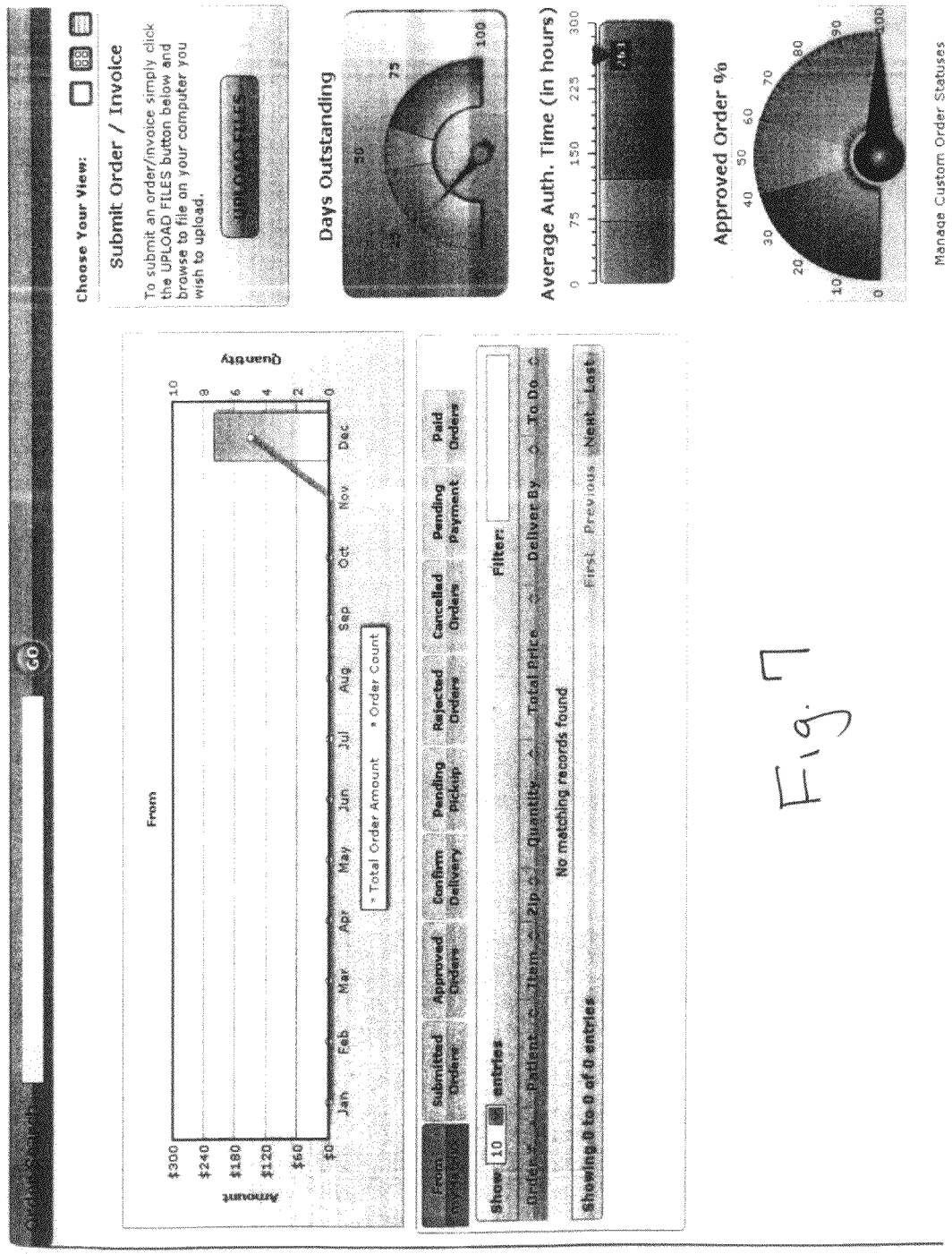

FIG. 1 illustrates a flow chart for a provider portal. The provider of items for an injured person pursuant to a worker's compensation claim can interact through a web portal with an insurer; a self insured entity; their employees, third party administrator broker. FIGS. 2-7 illustrate an example of screens used in a provider portal.

A computer and software stored on a machine-readable medium, such as a hard disk or disk array are used in implementing a provider portal and an adjuster portal. In one example, a computer system includes an SQL server operating a database populated with data generated by adjusters, providers and/or brokers. The computer system not only automates processes otherwise completed by people conversing over the telephone, but also provides unique advantages, such as Smart Care Carts and more in depth comparisons between items, costs, and availability. Often availability is more important than cost, and one item may not be satisfactory for all patients sharing an ICD9 code, depending on age and condition of the patient. For example, a HCPCS code identifying a cane can include a number of different types of canes and tips on the canes within a single HCPCS code.

Figure 8:
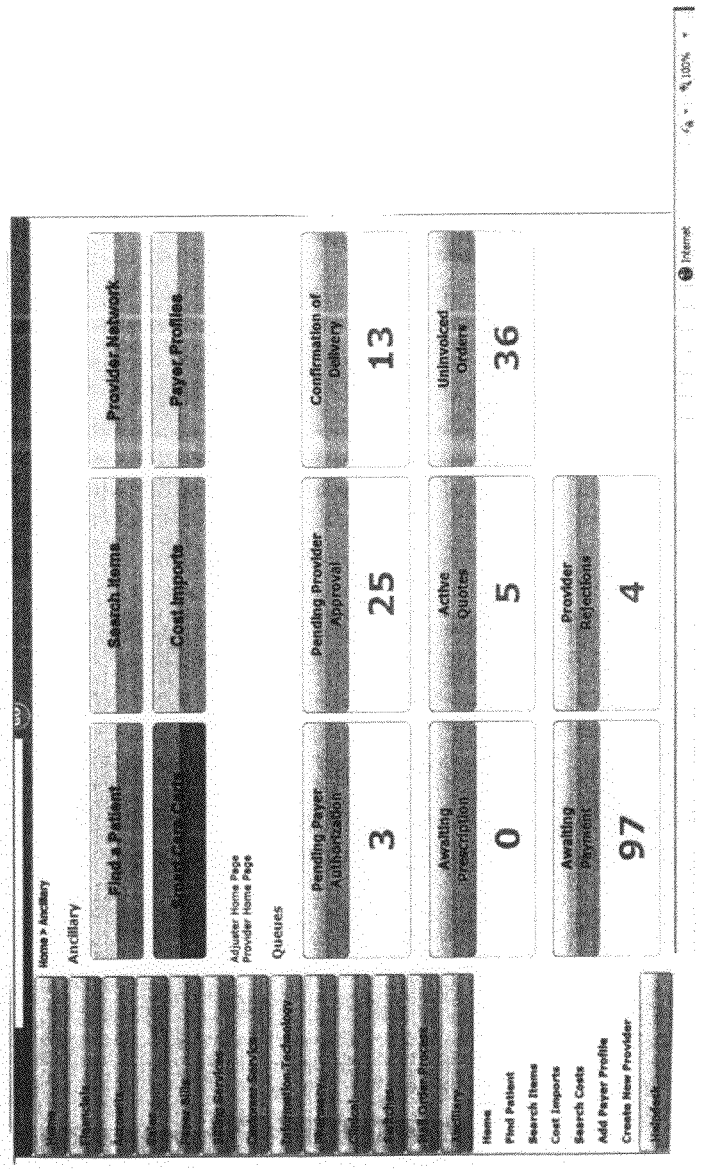

FIG. 8 illustrates a dashboard for managing the system.

Figure 9:
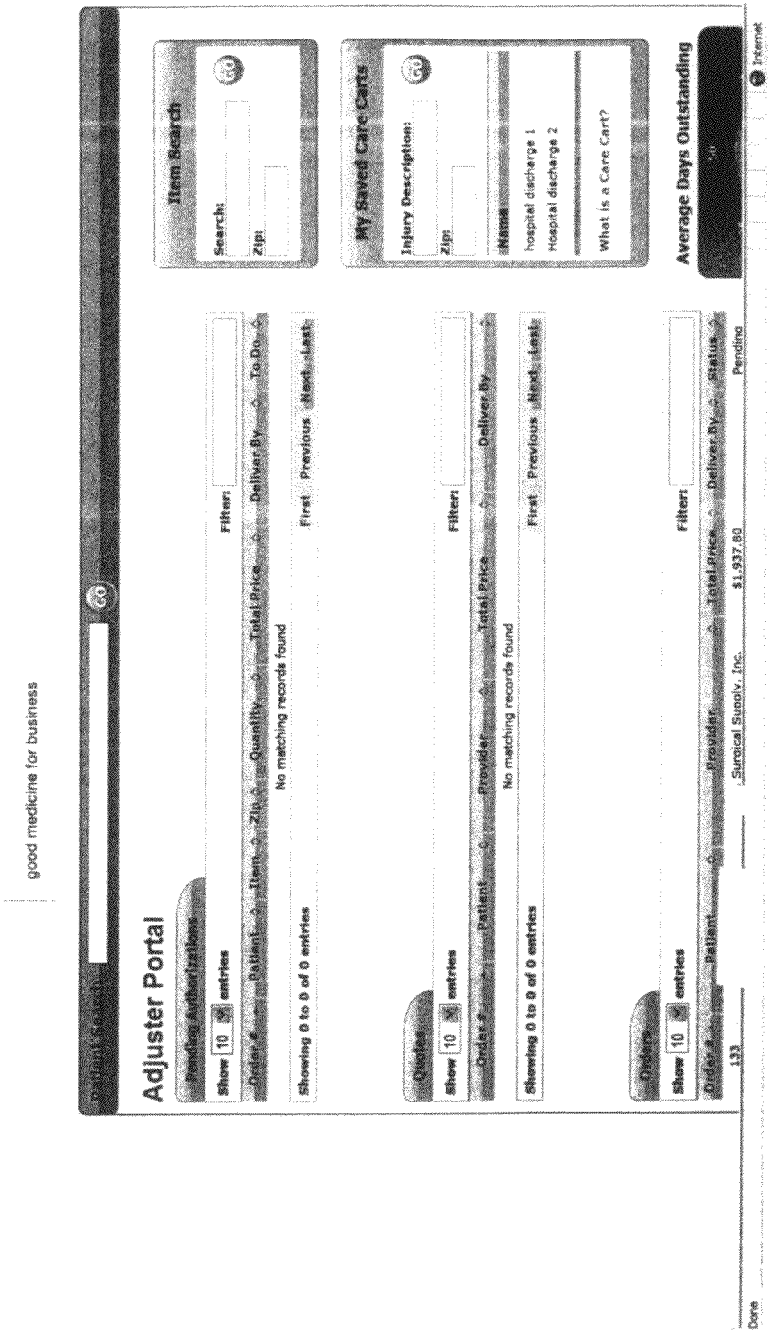
Figure 11:
Figure 13:
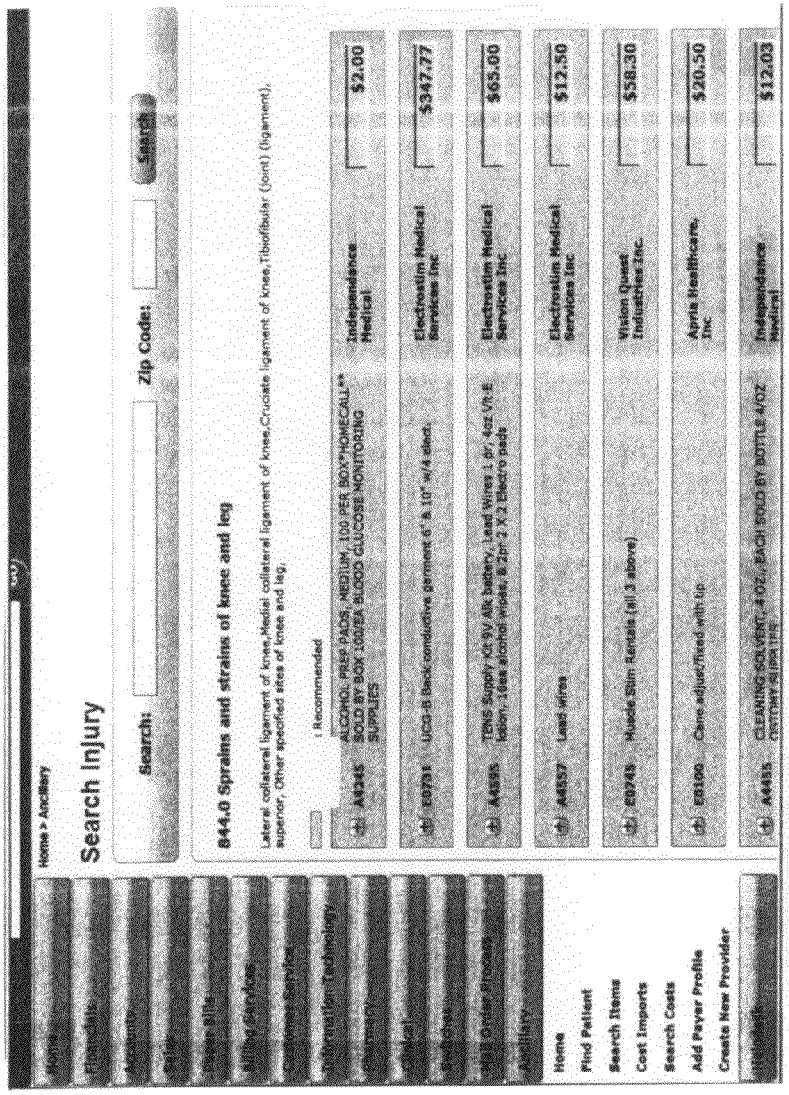

FIG. 9 illustrates an adjuster portal home screen for managing pending authorizations, quotations and orders. FIG. 10 illustrates an example of a search for a product by zip code, using an item description, HCPCS code or the like. FIG. 11 illustrates an example of an item being added to a Care Cart®[1]. FIG. 12 illustrates an example of a search by injury description and zip code of the adjuster's saved care carts. FIG. 13 illustrates a return on a search for the knee, providing ICD9 code 844.0 and a list of items associated with knee injuries by HCPCS codes. Each code has a + symbol next to the code and allows the list of items to be expanded for any of the HCPCS codes. For example, HCPCS code A4245 is expanded in FIG. 14 and HCPCS code A4557 is expanded in FIG. 15.

[1] Care Cart® is a registered trademark of MyMatrixx.

FIG. 16 illustrates additional features provided by the system, which can be offered to a broker and/or adjuster. Specifically, a broker may be interested in the margin provided on each item or on a set of items selected by an adjuster. This can be instrumental in providing discounts. In addition, the state fee schedule may limit the margin available on items. The adjuster may be interested in the provider ratings, illustrated here by a number of stars.

Figure 17:
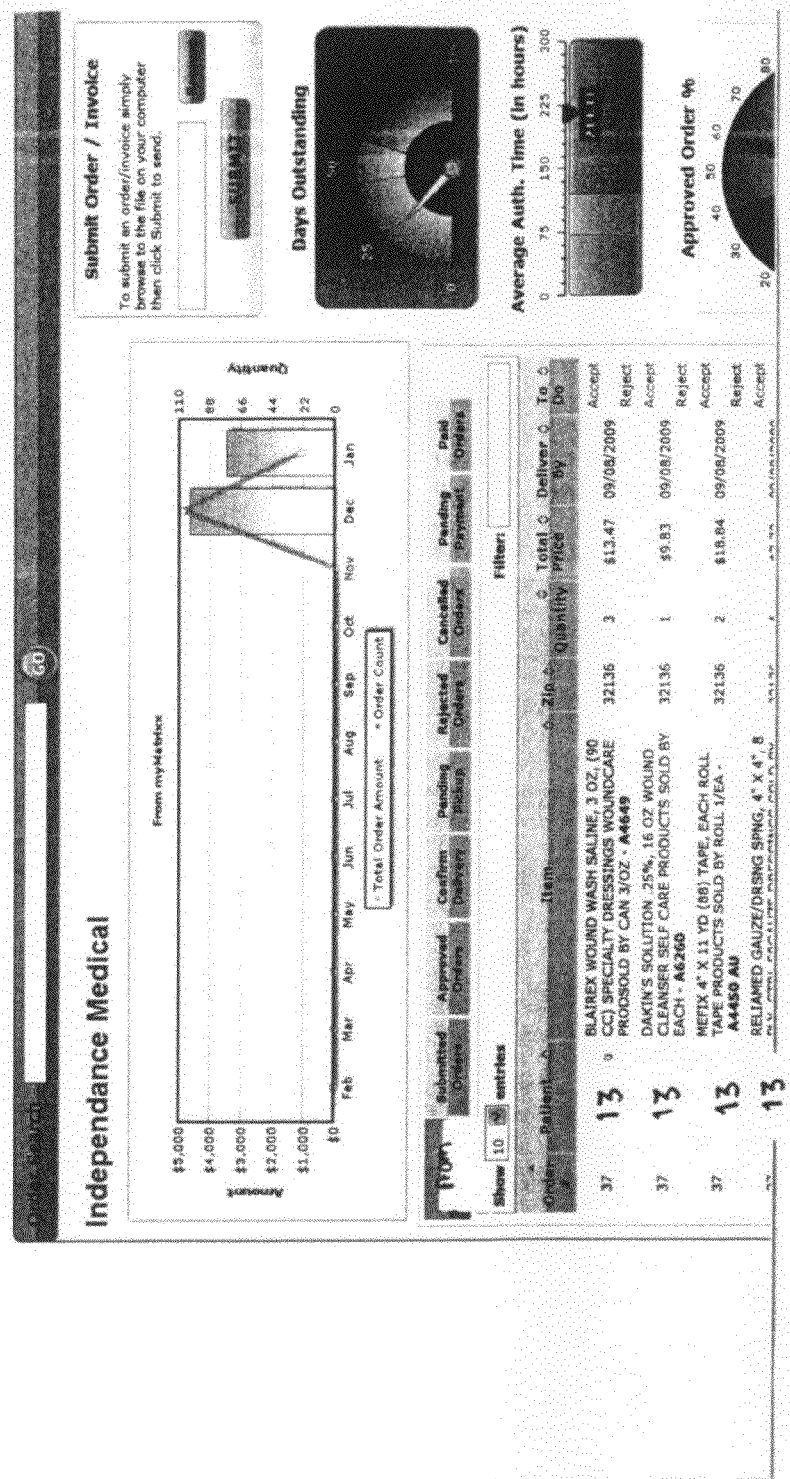

At checkout, the adjuster and provider are electronically notified and links are provided for approval and/or tracking of orders. In one example, an interface is provided for tracking of orders, such as the provider interface in FIG. 17.

FIG. 18 illustrates an example of a screen for maintenance of smart care carts that combine a variety of HCPC or specific items for a single ICD9 code. FIG. 19 illustrates on method of inputting items by HCPC code into a smart care cart for ICD9 847.0, sprains and strains of other and unspecified parts of back, lumbar thoracic. Smart care carts may be customized for sub-codes, such as 847.2 or 847.1, as well as for the more general codes, such as 847.

In one example, payers are provided with a portal to review and/or approve and/or pay for items provided by a provider that are requested and approved by an adjuster. This system can provide real time or near real time approval of requests to providers in advance of delivery of items to patients. A provider portal may have an indicator to show when the provider is authorized to deliver an item to a patient. In one example, the provider need not complete additional paperwork to seek reimbursement from an insurance carrier or one of the other payers after receiving an advance approval, which may speed reimbursement and may reduce overhead. In one example, payment is effected electronically from the payer to the provider as part of the system. For example, payment may be effected after an electronic and/or physical audit by a payer of the entire transaction captured by the system. The adjuster portal may allow the adjuster to approve the delivery of an item, and the adjuster portal may be linked to the payer portal to allow approval only after the adjuster's decision is authorized by the payer, a supervisor and/or a senior adjuster, for example, or otherwise. In one example, the approval and audit process of the system may depend on preferences of the payer and may be customizable by the payer or payers, including, without limitation, the state, the employer and the insurance carrier. In one example, an adjuster or supervisor may be given authority to approve decisions, their own and/or other adjuster's decisions, for example.

The entire system may be secured, encrypted and accessed only with unique identifiers and/or passwords. The audit system may have an additional layer of security, and portions of the entire system may be restricted to those have permission to access other portions of the system. For example, a provider may only have access to the provider portal in the system and may not have access to the audit system, adjuster portal and payer portal portions of the system. Some data in the database may be entered by a provider's entry in a provider portal, for example, but the data may not be available in the system until is checked and released for entry into the database. These checks may be automated and/or may be flagged for review by someone with authorization to check the data for accuracy and/or to clear an alert, such as a fraud alert.

Figure 20:
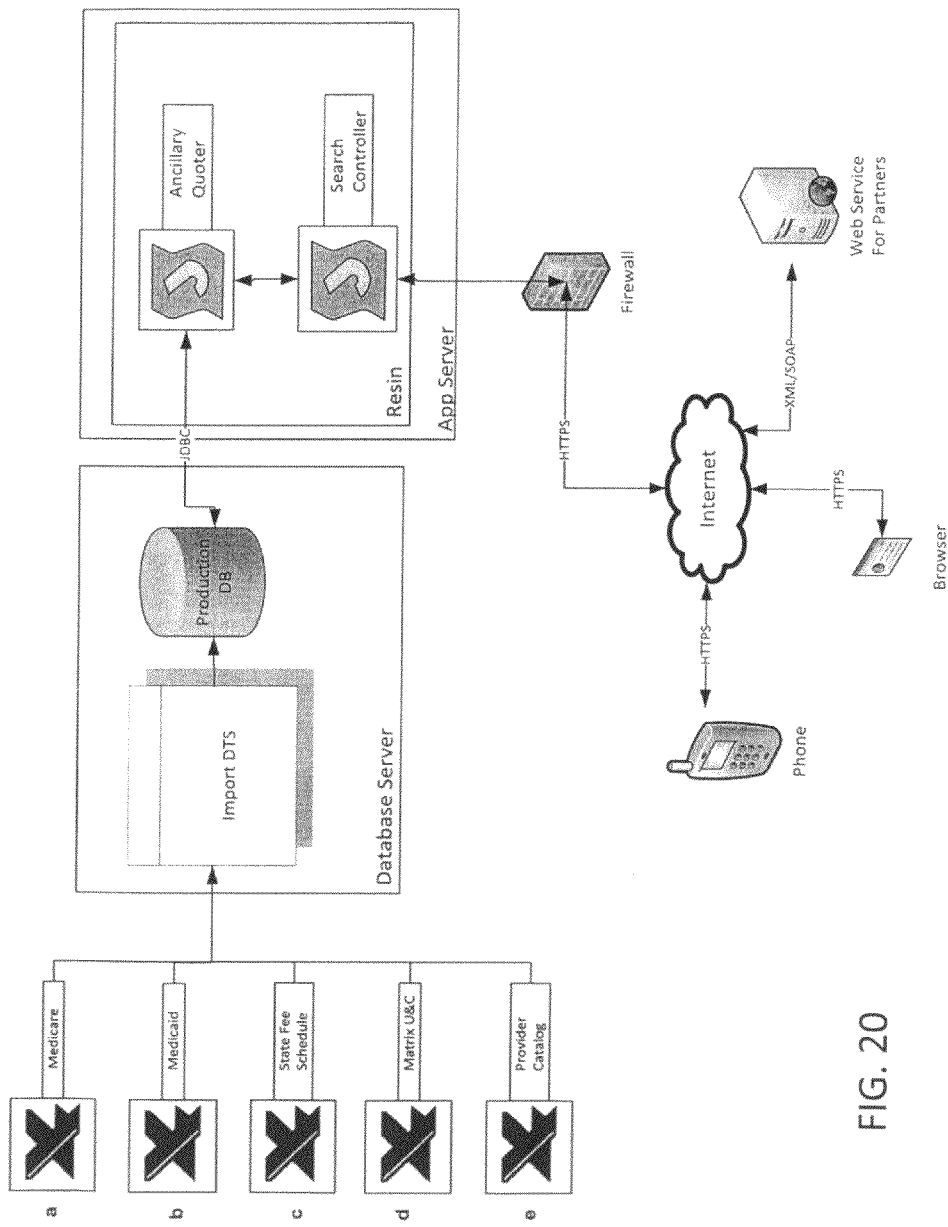
FIG. 20 illustrates an overview of one example of a production databased ERD.

In the example of FIG. 20, an overview of one example of a production database ERD is represented, wherein catalogs a-e represent specific spreadsheets used for inputting information about items that may be ordered within a computer system and method of providing devices for injuries under worker's compensation coverage. Specifically, a computer, such as a computer in a cellular telephone, a computer providing a browser or a computer providing web services for partners of a broker are capable of communicating over a network, such as the Internet. Using a secure https connection through a firewall, a connection may be made to an application server, providing for use of the computer system and method of providing devices for injuries under worker's compensation coverage. In one example, a box labeled Resin provides a computer, such as an application server, running a program, which may be firmware or software, presenting an ancillary quoter and a search controller. The Resin server is bi-directionally connected with a database server including a Production Database, which may be connected through a JDBC link, for example, with the Resin server. An interface (Import DTS) may be provided to import into the Production Database information from a plurality of spreadsheets catalogs (a-e), for example. This structure provides an unexpected advantage over other methods, providing for a simple and efficient way of updating the information contained in the production database.

The overview in FIG. 20 provides for an automated pricing process for creating an instant quote for ancillary products and services in the worker's compensation system. A variety of pricing options may be presented to an adjuster based on the entry of an injury code, ICD9 code, HCPCS codes, and a zip code. The pricing options may be tailored to the requirements of a specific payer, such as Medicare, Medicaid or a particular state, for example. Previously, producing a quote has been a cumbersome and complex procedure, requiring human intervention to obtain the quote and a substantial delay in obtaining the quote from a plurality of sources. This cumbersome process was further complicated by numerous laws and different fee schedules relating to the various payers, such as Medicare, Medicaid and Worker's Compensation systems of the various states and even by individual zip codes. An automated system provides for a customizable experience for both an adjuster and a provider. Overhead savings provide for a broker to provide brokering services between a plurality of adjusters and a plurality of providers, while not increasing the cost of items provided by the plurality of providers. A software as a service model may be provided that not only improves the previous system through automation but also provides an incentive for the broker to provide the automated services.

In one example, a worker's compensation system provides the following rates for each product quoted by the system: a usual and customary rate, an Ingenix usual, customary and reasonable (UCR) rate, one or more fee schedule amounts, a provider amount (AP), Medicare rates, Medicaid rates, Savings and Amount Due (AR). Rates may be gathered from a variety of sources, which are not limited to those shown in catalogs a-e of FIG. 20. A utility may be provided for uploading the rates and other information in the catalogs. The spreadsheet files of a catalog or a plurality of catalogs are formatted according to specific requirements for entry of the information contained in the catalogs into a database, such as an SQL database. For example, data is loaded into the Production Database of FIG. 20 using Data Transformation Services (DTS). Thus, the data may be staged for the Application Server (App Server) requests. In one example, a JAVA servlet listens for both web browser and XML/SOAP requires via an HTTPS secure protocol. The servlet, which may be a controller, may create an instance or instances of the Ancillary Quoter illustrated in FIGS. 20 and 27, for example, which may provide quotes on a list of products based on geographic location, such as zip code, and a product or service description or code, such as HCPCS codes.

FIG. 21 illustrates an example of a Medicare catalog, as shown in the overview of FIG. 20 (*a*), listing information by HCPCS codes in a spreadsheet format. The example of the Medicare catalog illustrated provides a plurality or rates with a ceiling and floor rate and various state rates shown in columns E-Y, for example.

FIG. 22 illustrates an example of a Medicaid, as shown in the overview of FIG. 20 (*b*), catalog listing information by state and HCPCS codes in a spreadsheet format. The Medicaid catalog lists the state in column A, HCPCS codes in column B, Medicare modifier in column C, state modifier in column D and the amount in Column E, for example.

FIG. 23 illustrates an example of a State Fee Schedule catalog, as shown in the overview of FIG. 20 (*c*), listing information by state and HCPCS codes in a spreadsheet format. The example in the catalog of FIG. 23 provides information for state fee schedules that allows an Ancillary Quoter to calculate reimbursement based on automated logic accommodating variations in the reimbursement strategies for individual states. Fixed Cost in column I provides an amount when states do not regulate the reimbursement rate for a specific product, for example.

FIG. 24 illustrates an example of a myMatrixx Usual and Customary catalog, as shown in the overview of FIG. 20 (*d*), listing information by HCPCS codes in a spreadsheet format, which provides information if the information is not available in one of the catalogs illustrated in FIGS. 21-23.

FIG. 25 illustrates an example of a Provider catalog in a spreadsheet format. All products and services provided by a specific branch of a provider is listed in a catalog such as that illustrated in FIG. 25, for example. The information provided includes rules for standard pricing.

Figure 26:
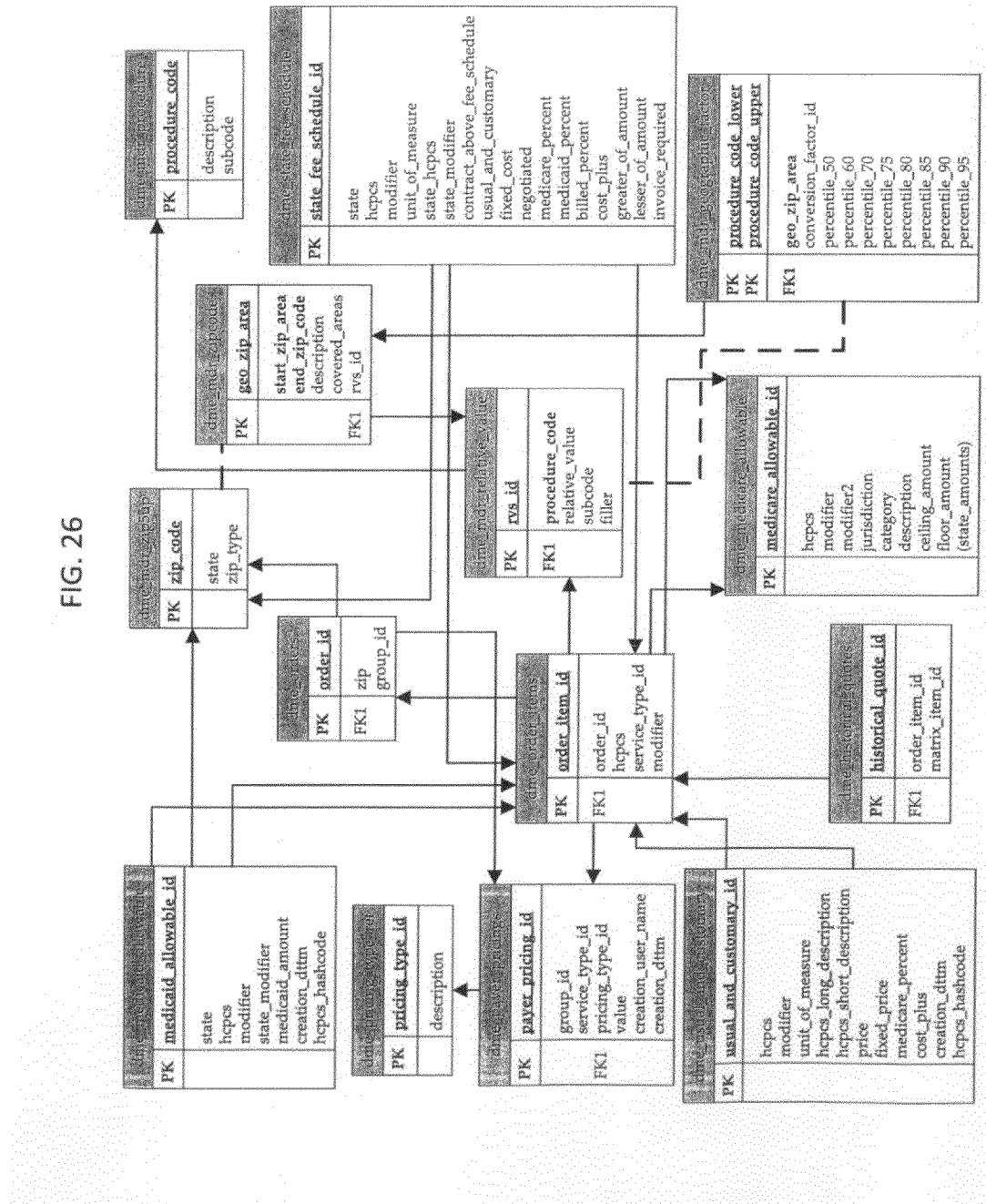
FIG. 26 illustrates an example of a database entry relationship diagram (ERD) for data from the catalogs, and an example of an implementation of the Ingenix UCR Model.

FIG. 26 illustrates examples of fields and modeling of the catalog data, and an example of an implementation of the Ingenix UCR Model. The example of the database entry relationship diagrams (ERD) diagrammatically shows the relationships between the data loaded from various spreadsheet catalogs, such as a-e in FIG. 20. An item added to a cart is represented in a DME_ORDER_ITEMS table. The example is simplified to show only certain fields that exist in order to clarify the relationships between those fields represented.

Figure 27:
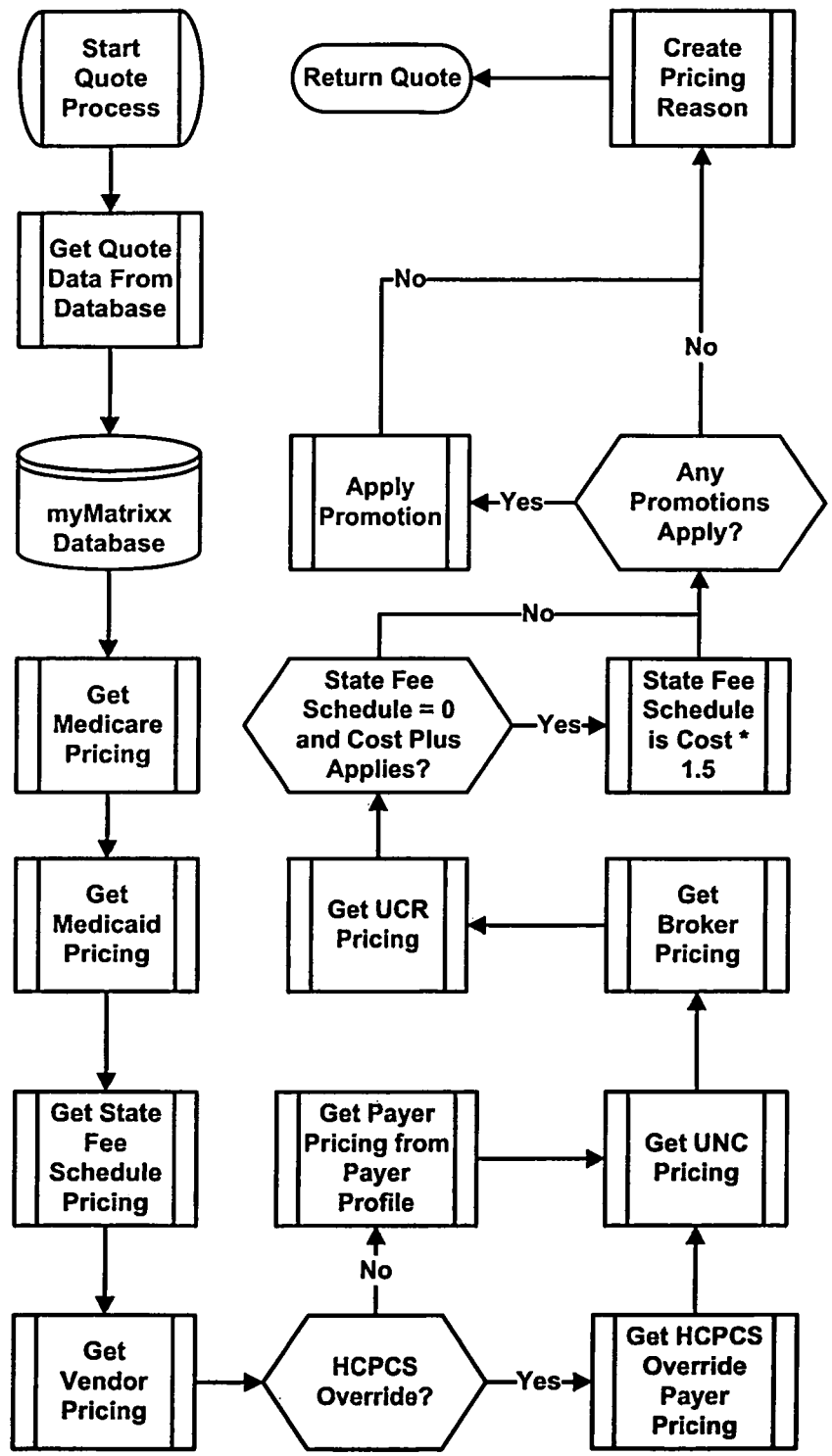
FIG. 27 illustrates a flow chart providing an example of an ancillary quoter process, as shown in the overview of FIG. 20.

FIG. 27 illustrates a flow chart providing an example of an ancillary quoter process, as shown in the overview of FIG. 20. This class generates all of the relevant amounts provided in each of the quotes and audits itself, automatically. The example in the flow chart yields an explanation of all of its charges and reasons for each selection value, for example.

Figure 28:
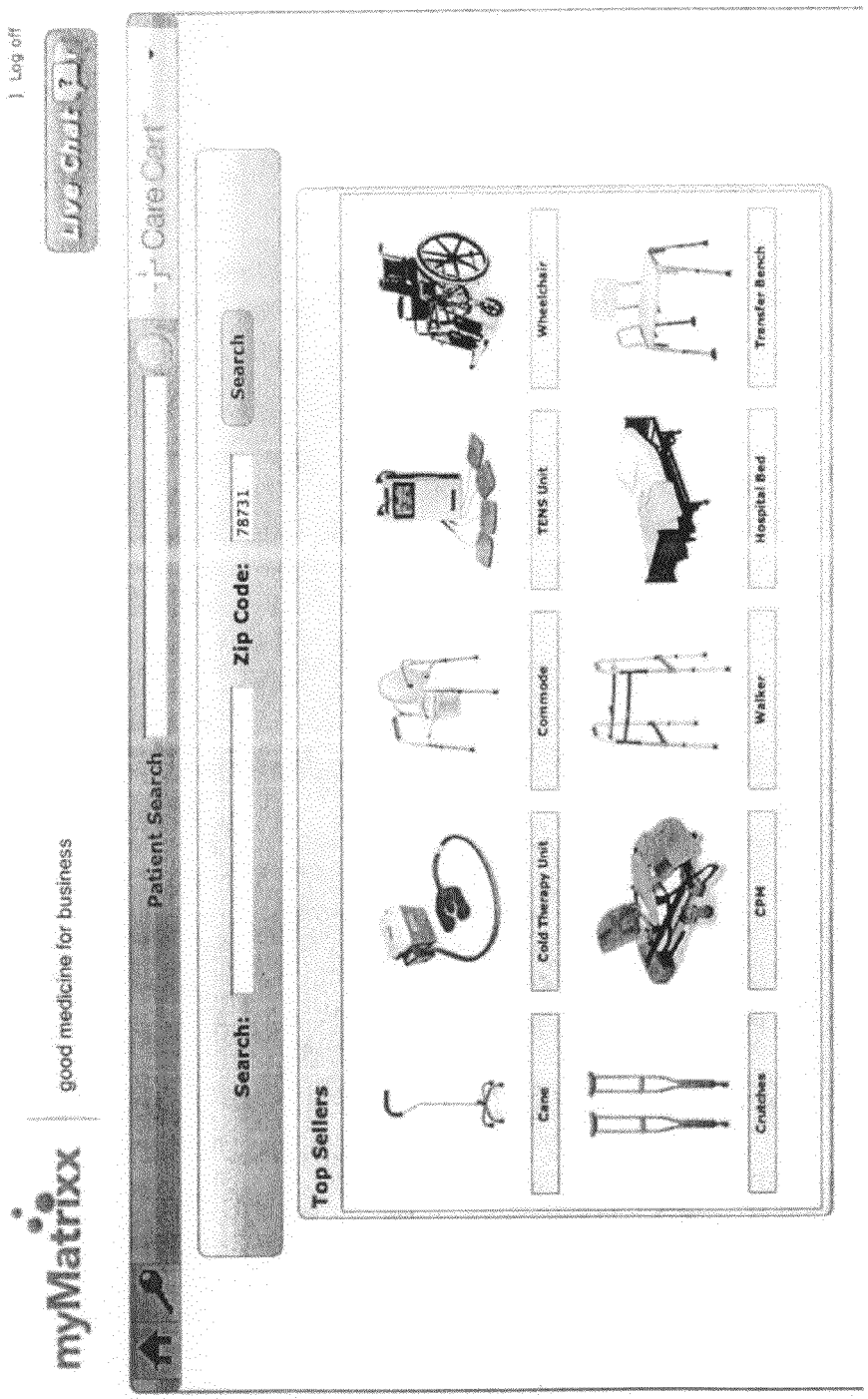
FIG. 28 illustrates an example of an ancillary search screen.

FIG. 28 illustrates an example of an ancillary search screen. A search may be performed by an adjuster, for example, using an item description, such as part of a name or part of a description, or a HCPCS code. In the example, a zip code is required, also. This starts the process of the Ancillary Quoter, for example.

As illustrated in FIG. 29, an example of a search result screen may display the price, savings and percent savings for each item identified by a description as provided by a particular provider. This allows the adjuster to select a provider from the search results. Each result shows corresponding savings value based on the difference of the system's billed amount and the amount provided in one of the catalogs, such as an Ingenix UCR value (when available) and/or a State Fee Schedule, for example.

Figure 30:
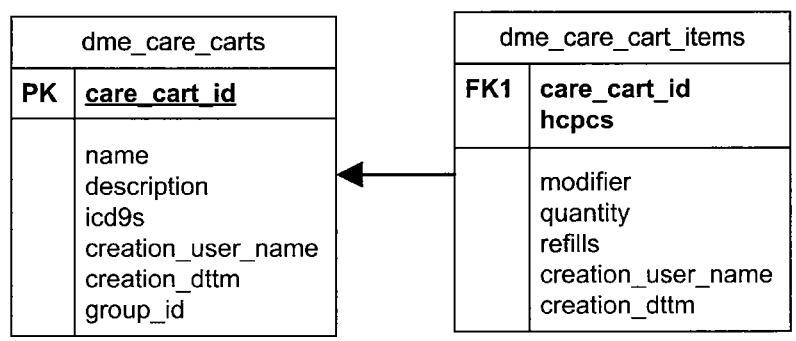
FIG. 30 illustrates an example of the modeling of the items related to a Care Cart or Smart Cart.

FIG. 30 illustrates an example of the modeling of the items related to a Care Cart or Smart Cart. An unexpected advantage of the system is the addition of items in a formulary to a Care Cart. An adjuster is not a health care professional, ordinarily. Therefore, the adjuster may not know how to select specific items when ordering for a patient under a specific worker's compensation claim. Care Carts or Smart Care Carts may be provided to assist adjusters in completing purchases based on injury codes (e.g. ICD9.x) and ancillary products and/or services. An adjuster may enter an injury description and select all of the relevant items to the adjuster's shopping cart at one time, saving both search and entry time and effort. Care Carts may be used to determine related items when an adjuster is ordering a single item, such as an item identified by a HCPCS code. For example, an adjuster selecting a cane may be prompted to include cane tips, such as by being presented with a message, such as "Users that purchased this item also bought cane tips." In one example, a Care Cart is an ICD9.x formulary. In another example, an adjuster and/or the adjuster's company may create a default or preferred Care Cart based on rules established by the adjuster or the adjuster's employer. In addition, the system may automatically generate an alert if an item is ordered outside of a formulary for a specific injury. Certain items may be pre-authorized from a Care Cart, without any need to call or to make any further contact to seek authorization.

FIG. 31 illustrates an example of a Care Cart Library screen shot. The library shows the name and description of a Care Cart in a list of Care Carts and shows who created the Care Cart and when the Care Cart was created, for example.

In FIG. 32, management of a particular Care Cart is illustrated. Items may be added to a Care Cart by entering the HCPCS codes, for example, together with any modifiers, quantity and refills permitted. The addition of an ICD-9 Code and Name and Description provides for the criterion used in selecting a particular Care Cart, for example. Each Care Cart may provide one or a plurality of items. Also, a search for a specific injury description might yield a plurality of results.

Figure 33:
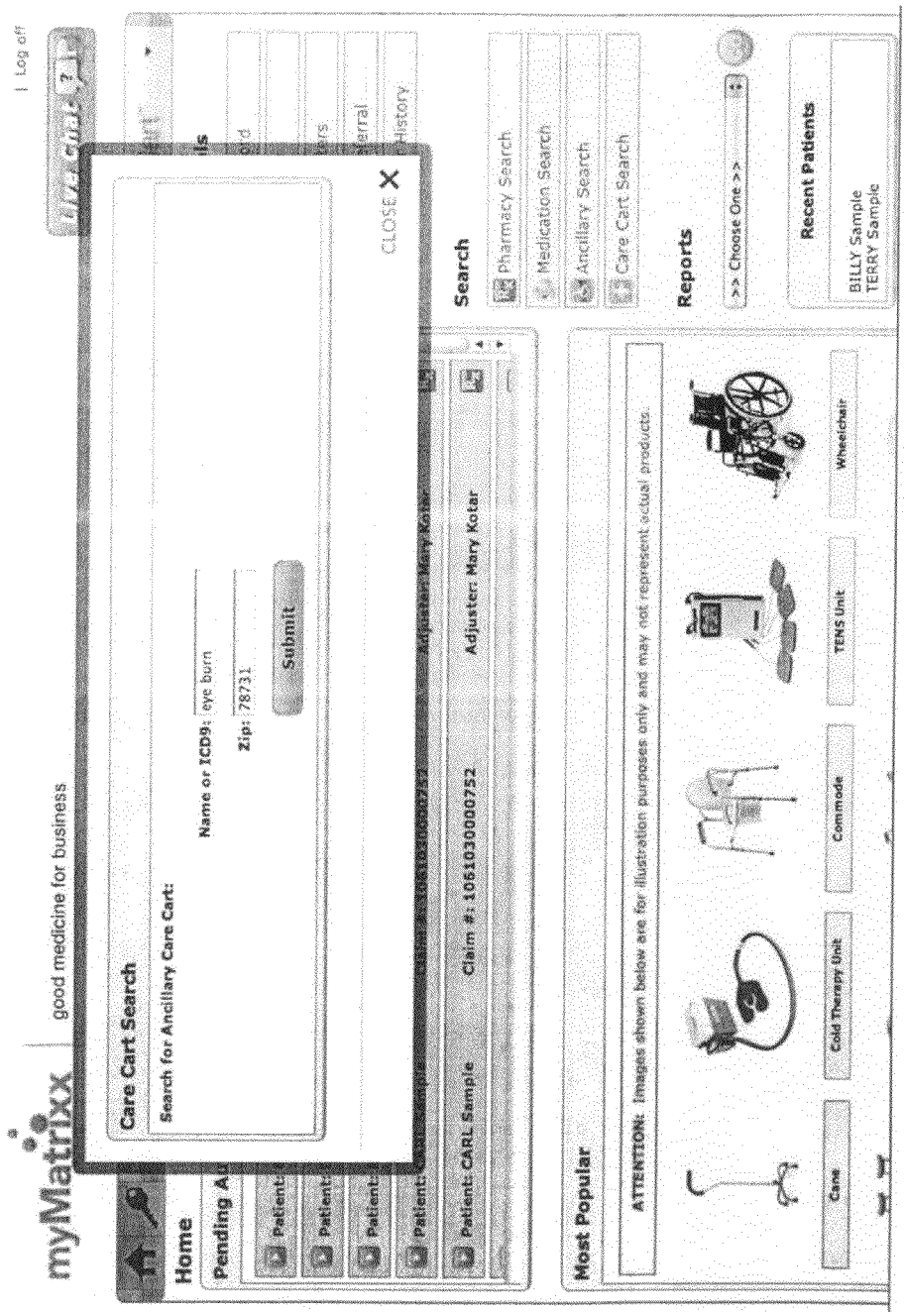
FIG. 33 illustrates one example of an entry for a search for an Ancillary Care Cart using a part of an injury description and a zip code.

FIG. 33 illustrates one example of an entry for a search for an Ancillary Care Cart using a part of an injury description (eye burn) and a zip code (78731). Alternatively, an ICD-9 might be entered instead of an injury description.

Figure 36:
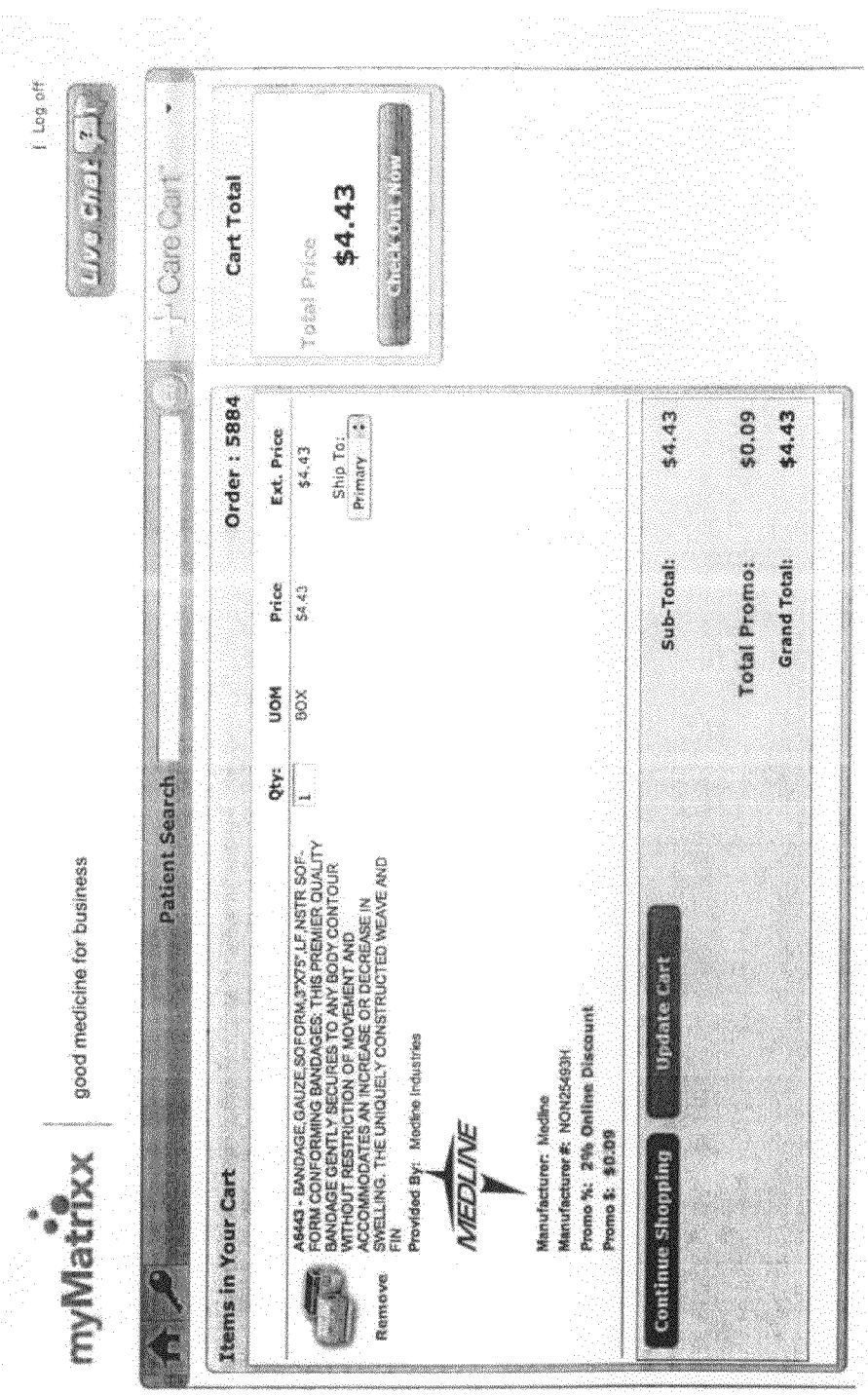
FIG. 36 illustrates an example of the addition of an item to a shopping cart from a Care Cart.

FIG. 34 illustrates an example of a results screen shot for the example in FIG. 33. Injury code 940 matched "eye burn" and resulted in the listing of a plurality of items. An adjuster may select using a check box the products to include and then may select to add the items to the adjuster's shopping cart. FIG. 35 illustrates an example detail screen for an item showing a plurality of providers for each item in a Care Cart; therefore, the adjuster may select from a plurality of providers, if more than one provider provides the items listed in the Care Cart. By clicking the + symbol, a list of providers and/or alternative products may be displayed, for example. In FIG. 36 an adjuster added gauze to a shopping cart from a Care Cart, and the adjuster is provided with options to continue shopping, update the shopping cart or check out now, for example.

Figure 37:
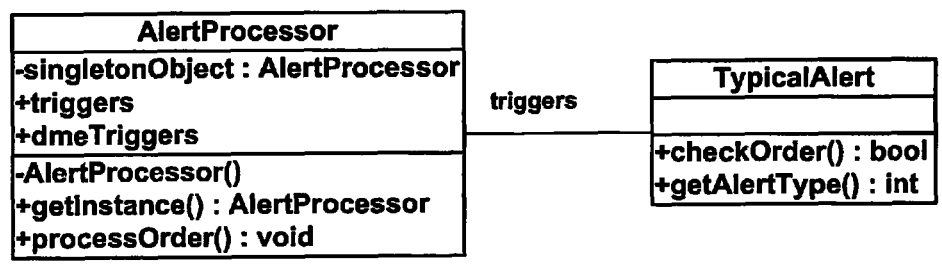
FIG. 37 illustrates an example of an alerter class used to process alerts.
Figure 38:
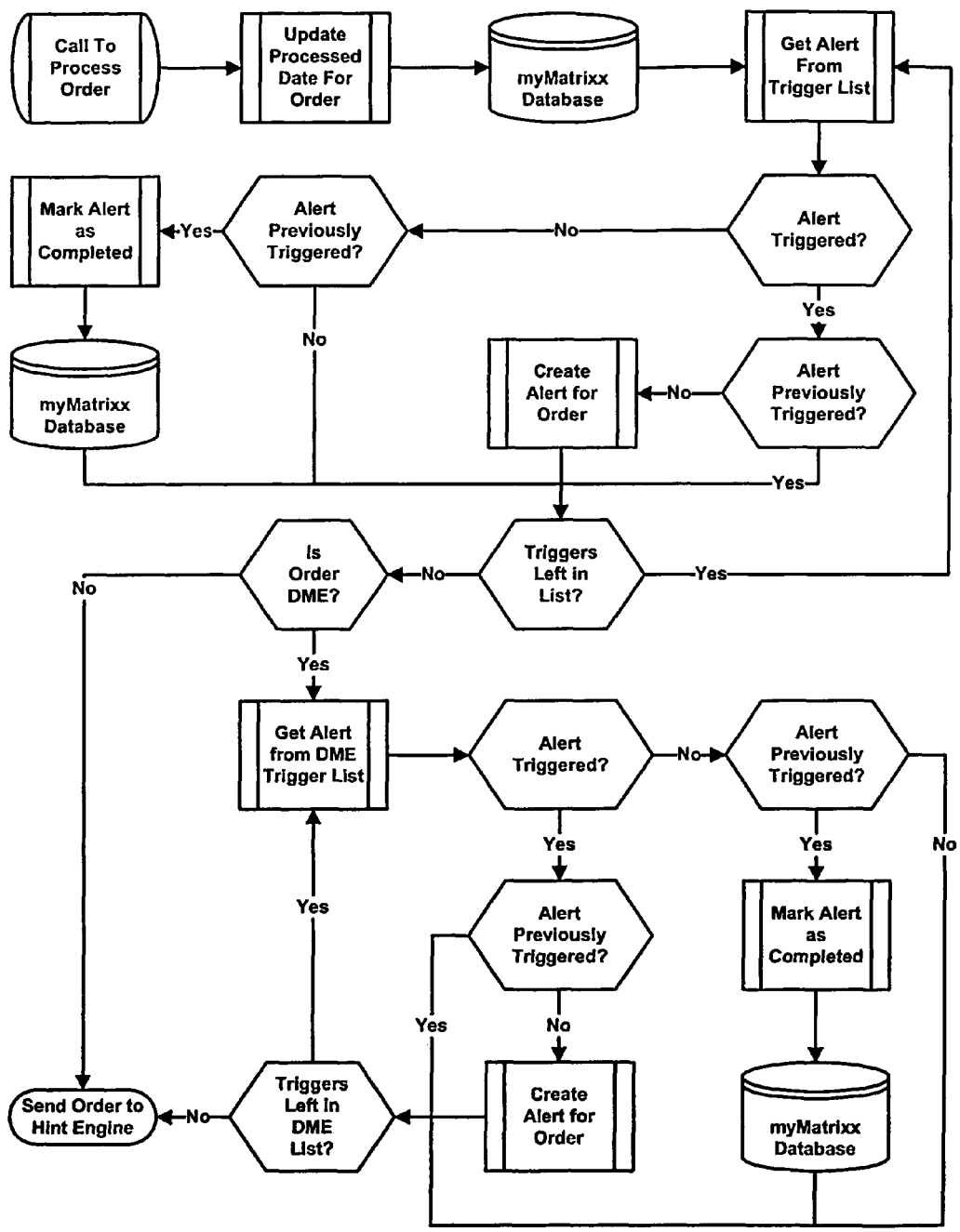
FIG. 38 illustrates an example of a flow chart for order processing including alert processing using the example of FIG. 37.

In FIG. 37, an example of an alerter class is used to process alerts. A complication preventing successful automation of ordering items and services within a worker's compensation system has been billing and documentation for billing. Specific requirements of insurance companies and government agencies require additional information relating to formal documentation, patient contact information, specific billing forms and dates for follow-up with specific providers, depending on the HCPCS codes and other information in the catalogs. An alert management system provides instructions to the adjuster to navigate each of the requirements. For example, the alerts may be implemented in JAVA, and each order may be scanned continuously for any alerts that arise in processing. When all of the alerts have been removed by compliance with proper procedures, an order is billable. For example, FIG. 38 illustrates a flow chart for order processing including alert processing using the example of the JAVA UML of FIG. 37. FIG. 39 illustrates an example of source code for an alerter class, while FIG. 40 illustrates an example of an alert screen shot for order #5244. Alerts are requiring the adjuster to take the following steps: to provide either the fax or email of the provider, to provide the name of the provider representative, and to confirm delivery. This instructs the adjuster or other customer service representative of the next steps to take for processing the adjuster's order ensuring consistency and quality of services and products.

What is claimed is:

1. A computer system for providing items and services for injuries under workman's compensation coverage comprises:
    a server and software stored on a computer readable medium accessible by the server;
    data being stored in a database accessible by the server;
    a network portal capable of connecting users of the system to the server and coupling the server and the database, the server, the database and the network portal being arranged such that the system provides the network portal to the users, including an adjuster portal for an adjuster seeking to order ancillary items, ancillary services or both and a provider portal for a plurality of providers seeking to provide the ancillary items, the ancillary services or both, wherein the adjuster selects the ancillary items, the ancillary services or both by entering a portion of a name of an injury or an ancillary item, a portion of a description of the injury or the ancillary item, an item code of the ancillary item or an injury code of the injury, using the adjuster portal, and the server provides the adjuster with at least one of the ancillary items, at least one of the ancillary services or both related to the item code or the injury code within the database and displays the at least one of the ancillary items, the at least one of the ancillary services or both within a care cart within the adjuster portal such that the adjuster is capable of selecting the at least one of the ancillary items, the at least one of the ancillary services or both from the care cart based on the data stored in the database without waiting for bids or quotes to be provided from the plurality of providers;

an automated request to provide the at least one of the ancillary items, the at least one of the ancillary services or both is transmitted from the server over the network setting at least one specific price, such that the one or more of the plurality of providers is capable of accepting the automated request using the provider portal connected to the server; and the system automatically generates alerts to one or more of the users that require the user or users to provide additional information or to take a particular action to make an order processed by the system billable by a payer.

2. The computer system of claim 1, wherein the network portal includes the presentation of a web portal provided on the Internet.

3. The computer system of claim 1, wherein the care cart provided by the system is customizable by the adjuster or the adjuster's employer.

4. The computer system of claim 1, wherein items are added to a care cart using an automated algorithm relating the at least one of the ancillary items, the at least one of the ancillary services or both to both the injury code and a zip code.

5. The computer system of claim 4, wherein the system transmits the care cart to the adjuster portal and presents the adjuster with an option to add or delete the at least one of the ancillary items, the at least one of the ancillary services or both from the care cart list.

6. The computer system of claim 5, wherein the system transmits to the adjuster portal a cost and availability of the at least one of the ancillary items, the at least one of the ancillary services or both in the care cart including a discount provided to the adjuster.

7. The computer system of claim 6, wherein the system presents a provider with the provider portal using the network such that the provider may upload data, including a direct order between a patient, a physician or both thereof.

8. The computer system of claim 7, wherein the computer system provides the adjuster with a link to the adjuster portal to approve, modify or deny the order.

\* \* \* \* \*